(12) United States Patent
Horaguchi

(10) Patent No.: US 6,359,704 B1
(45) Date of Patent: Mar. 19, 2002

(54) IMAGE READER AND APPARATUS INCORPORATING THE SAME

(75) Inventor: Yoichi Horaguchi, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/116,665

(22) Filed: Jul. 17, 1998

(30) Foreign Application Priority Data

Jul. 24, 1997 (JP) ............................................. 9-198490

(51) Int. Cl.⁷ .................................................. H04N 1/04
(52) U.S. Cl. ....................................... 358/474; 382/287
(58) Field of Search ................................ 358/474, 475, 358/501, 537, 538, 401, 452; 382/287

(56) References Cited

U.S. PATENT DOCUMENTS

| | | | | |
|---|---|---|---|---|
| 4,907,091 A | * | 3/1990 | Yoshida et al. | 358/474 |
| 5,048,106 A | * | 9/1991 | Naksjima et al. | 382/47 |
| 5,691,825 A | * | 11/1997 | Fujiwara | 358/497 |
| 5,724,173 A | * | 3/1998 | Chuan | 359/210 |
| 5,970,181 A | * | 10/1999 | Ohtsu | 382/274 |
| 6,009,292 A | * | 12/1999 | Jinbo | 399/208 |

FOREIGN PATENT DOCUMENTS

JP     A-61-111058     5/1986

* cited by examiner

*Primary Examiner*—Jerome Grant, II
*Assistant Examiner*—Negussie Worku
(74) *Attorney, Agent, or Firm*—Oliff & Berridge, PLC

(57) ABSTRACT

An image reader for an image-carrying member is provided which includes a light source for illuminating the image-carrying member, a sensor for detecting light coming from the image-carrying member along a predetermined optical path, and an optical system including a lens fixed to a lens holder. The lens holder together with the lens is movable along the optical path for adjusting the focus of the lens. The image reader also includes a shield member for partially blocking the passage of the light coming from the image-carrying member. The lens and the shield member keep a predetermined distance to each other while the focal adjustment of the lens is being performed.

18 Claims, 4 Drawing Sheets

IMAGE READER AND APPARATUS INCORPORATING THE SAME

BACKGROUND OF THE INVENTION

1. Field of the Invention

The present invention relates to an image reader used for reading out images (and/or text) carried by a sheet member (such as an opaque paper sheet or a transparent plastic sheet). The present invention also relates to an apparatus incorporating such an image reader.

2. Description of the Related Art

Typically, an image reader of the above type includes a light source for illuminating image-carrying members, a light-sensitive detector (such as a charge-coupled device) for detecting reflection light coming from the image-carrying member, and an optical system (including a combination of mirrors and lenses) for leading the above reflection light to the light-sensitive detector.

In general, the light-sensitive detector is an elongated sensor consisting of e.g., phototransistors arranged in an array. Due to this linear arrangement, phototransistors disposed near the longitudinal ends of the detector tend to receive less light (less luminous energy) than those disposed around or at the center of the detector do. Such imbalance is undesirable and needs correction. (The correction will be called "shading correction" hereinafter).

One way to provide the shading correction may be to use a light shield member arranged for partially blocking the passage of the reflection light. An example of light shield member is disclosed in Japanese Patent Application Laid-open No. 61(1986)-111058. As shown in FIG. 4 of the above application, the conventional light shield member 22 includes a downward protrusion hanging in front of the lens 7. In this arrangement, central region of the light passage is partially blocked so that intended shading correction is provided.

A problem associated with the light shield member of the above application is as follows. As shown in FIG. 4 of the above application, the conventional light shield member 22 is attached to a stationary frame 21. In accordance with the conventional arrangement, the distance between an image forming lens 7 and the light shield member 22 may vary when the lens 7 is shifted with respect to the frame 21 for adjustment of the focus of the lens 7. Such variation may unduly affect the light-shielding performance of the light shield member 22, whereby the intended shading correction will not be obtained.

SUMMARY OF THE INVENTION

It is, therefore, an object of the present invention is to provide an image reader capable of overcoming the above problem.

Another object of the present invention is to provide an apparatus in which such an image reader is advantageously incorporated.

According to a first aspect of the present invention, there is provided an image reader for an image-carrying member comprising:

a light source for illuminating the image-carrying member;

a sensor for detection of light coming from the image-carrying member along a predetermined path;

a lens movable along said path for focal adjustment; and a shield member for partially blocking passage of said light;

wherein the lens and the shield member are identically moved while the focal adjustment of the lens is being performed.

With such an arrangement, the lens and the shield member are identically moved (meaning that the lens and the shield member keep an initial distance to each other). Thus, the intended shading correction is obtained even when the lens is shifted in position for its focal adjustment.

According to a preferred embodiment of the present invention, the image reader further comprises a lens holder for fixing the lens and a carrier member for carrying the lens holder. The carrier member is movable along said path.

The carrier member may be formed with a groove extending through the carrier member, while the image reader may further comprise a stationary guide rail fitted in the groove of the carrier member. In the assembled state, the carrier member is slidable along the guide rail.

The lens holder may comprise a cylindrical member having a curved side surface, and the carrier member may have a curved surface for supporting the lens holder.

Advantageously, the carrier member is provided with a first wall and a second wall. The first wall may include the shield member. The second wall may be shorter than the first wall.

A distance between the first wall and the second wall may be substantially equal to a length of the lens holder. In this arrangement, the lens holder is readily attached to the carrier member simply by inserting the lens holder into. a space between the first wall and the second wall.

Preferably, the carrier member, the first wall and the second wall may be formed integral to each other as a single piece.

According to a second aspect of the present invention, there is provided an image reader for an image-carrying member comprising:

a sensor for detection of light coming from the image-carrying member along a predetermined path;

a lens movable along said path for focal adjustment; and a shield member for partially blocking passage of said light;

wherein the lens and the shield member are arranged to keep a predetermined distance to each other while the focal adjustment of the lens is being performed.

According to a third aspect of the present invention, there is provided a facsimile machine incorporating an image reader for an image-carrying member, the image reader comprising:

a light source for illuminating the image-carrying member;

a sensor for detection of light coming from the image-carrying member along a predetermined path;

a lens movable along said path for focal adjustment; and a shield member for partially blocking passage of said light;

wherein the lens and the shield member are identically moved while the focal adjustment of the lens is being performed.

According to a fourth aspect of the present invention, there is provided a multi-function apparatus having functions of a facsimile machine, a printer, an image scanner, a photocopier, or the like, the multi-function apparatus incorporating an image reader for an image-carrying member, the image reader comprising:

a sensor for detection of light coming from the image-carrying member along a predetermined path;

a lens movable along said path for focal adjustment; and a shield member for partially blocking passage of said light;

wherein the lens and the shield member are arranged to keep a predetermined distance to each other while the focal adjustment of the lens is being performed.

Other objects, features and advantages of the present invention will be apparent from the detailed description of the embodiment given below with reference to the accompanying drawings.

DETAILED DESCRIPTION OF THE PREFERRED EMBODIMENT

The preferred embodiment of the present invention will be described below with reference to the accompanying drawings.

Figure 1:
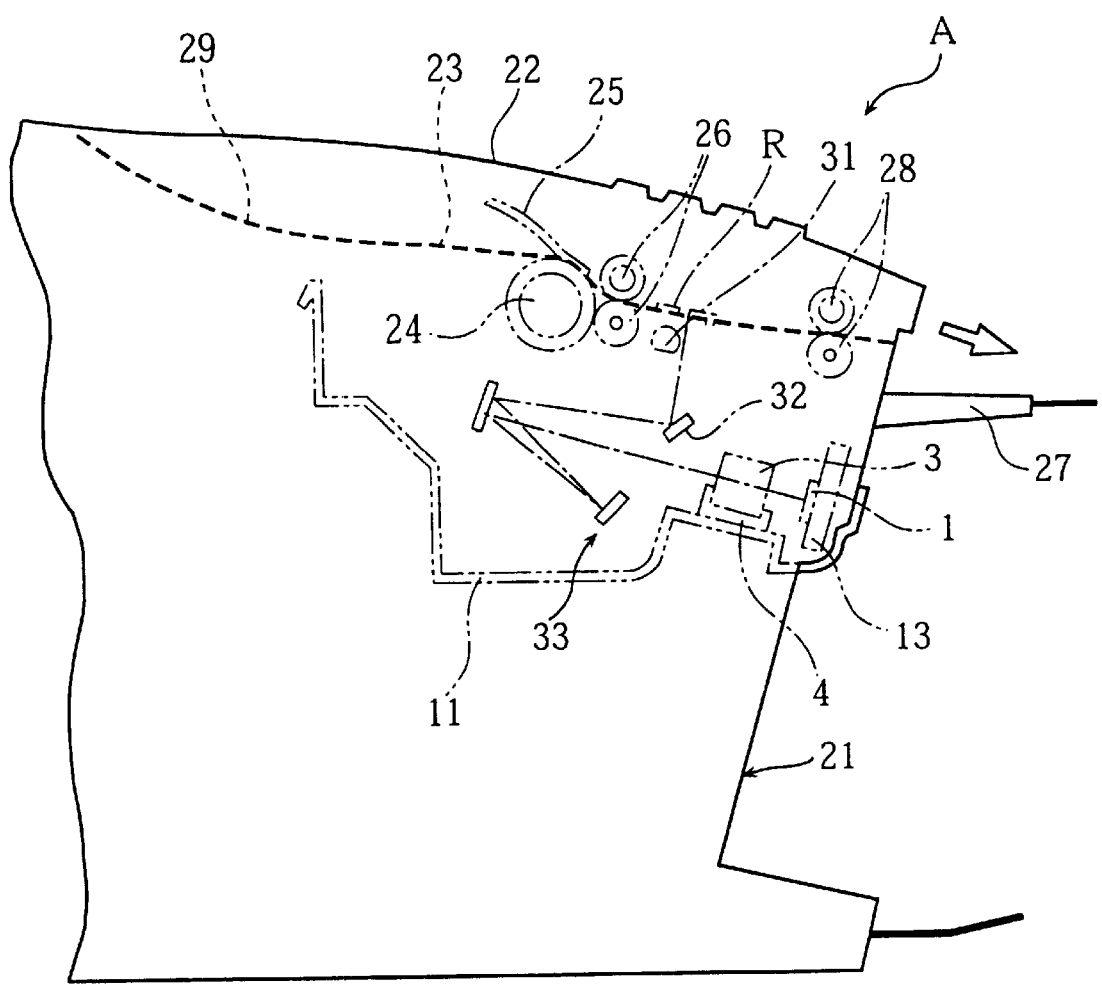
FIG. 1 is a side view schematically showing principal parts of a multi-function apparatus according to the present invention.

Reference is first made to FIG. 1 which is a sectional side view schematically showing principal parts of a multi-function apparatus A embodying the present invention. The multi-function apparatus A, which is connected to a suitable personal computer (not shown), may incorporate a facsimile machine, a printer, an image scanner and a photocopier for example.

The multi-function apparatus A includes a housing 21 whose upper surface is provided with a control panel 22. A sheet transfer path 23 extends below the control panel 22 in a substantially horizontal manner. A sheet feed section 29 for holding sheet members (not shown) carrying images and/or text is arranged adjacent to an upstream end portion of the transfer path 23. The sheet members to be transferred may be opaque paper sheets, transparent plastic sheets made of a resin material for example, or the like.

The multi-function apparatus A also includes a feed roller 24, a sheet separation member 25 held in contact with the feed roller 24, a pair of guide rollers 26, and a pair of discharge rollers 28. The rollers 24, 26 and 28 and the separation member 25 are disposed at predetermined locations along the transfer path 23. The separation member 25 is provided for preventing more than one sheet member from being simultaneously supplied from the sheet feed section 29.

The feed roller 24, the guide rollers 26 and the discharge rollers 28 are associated with suitable actuators such as stepping motors (not shown). Thus, in operation, the sheet member held in contact with these rollers is transferred along the transfer path 23, and eventually discharged into a discharged sheet tray 27.

According to the illustrated embodiment, the images (and/or text) carried by each sheet member will be read out at a reading section R located between the guide rollers 26 and the discharge rollers 28. To this end, an image reader is incorporated in the multi-function apparatus A. The image reader is made up of a light source 31 located below the reading section R for illuminating the sheet member, an optical system 33 including a certain number of mirrors 32 and a CCD (charge-coupled device) image sensor 1 mounted on a substrate 13. The CCD image sensor 1 may include a plurality of phototransistors arranged in an array.

The respective mirrors 32 of the optical system 33 are arranged so that image-carrying reflection light coming from the illuminated sheet member is properly led to the CCD image sensor 1. The CCD image sensor 1, though not shown in FIG. 1, is an elongated device extending in a horizontal direction perpendicular to the sheet transfer path 23.

Figure 2:
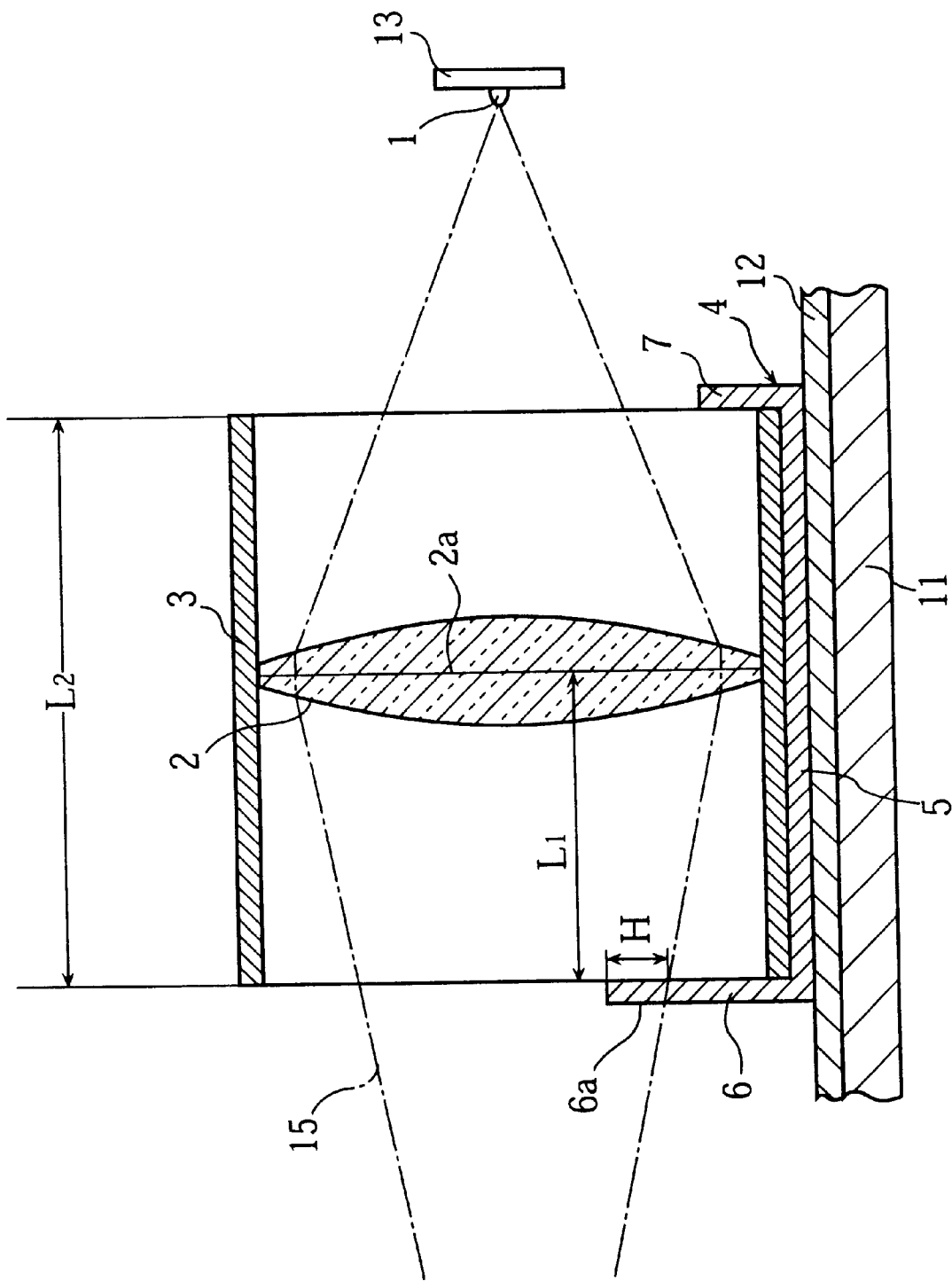
FIG. 2 is a sectional view showing a lens and other relevant members used in an optical system for an image reader incorporated in the multi-function apparatus of FIG. 1.
Figure 3:
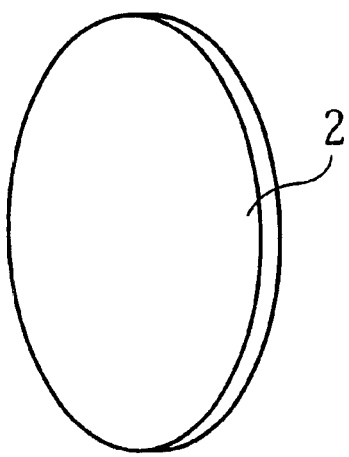
FIG. 3 is a perspective view showing the lens of FIG. 2.

Referring to FIG. 2, the optical system 33 also includes a convex lens 2 made of a glass material for example. As can be seen, the lens 2 is used for converging the image-carrying reflection light 15 onto the CCD image sensor 1. The convex lens 2 is circular in shape as viewed from the front (see FIG. 3). However, the configuration of the lens 2 is not limited to this.

Figure 4:
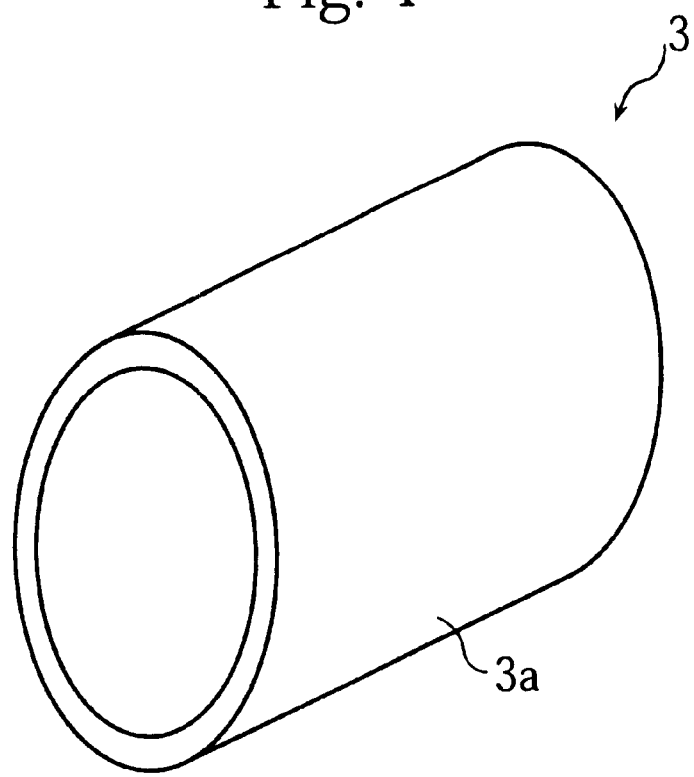
FIG. 4 is a perspective view showing the lens holder of FIG. 2.

As shown in FIG. 2, the lens 2 is fixed within a lens holder 3 which may be made of a resin material for example. For internally holding the lens 2, the lens holder 3 is made into a cylindrical form (see also FIG. 4) having an inner diameter which is smaller than the diameter of the lens 2, and an outer diameter which is greater than the diameter of the lens 2. The illustrated section of the lens 2 is divided into two equal areas by a vertical line 2a. With the vertical line 2a used as reference, the lens 2 is spaced from a front edge of the lens holder 3 by a predetermined distance L1.

Figure 5:
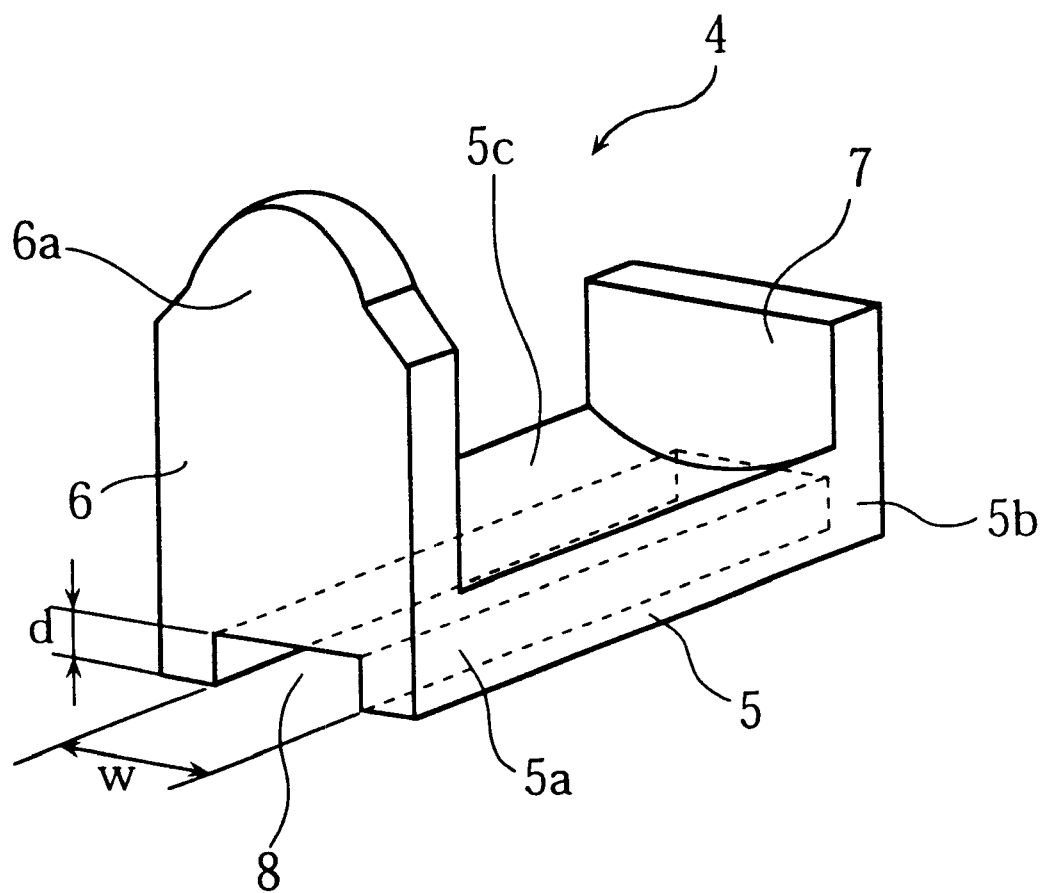
FIG. 5 is a perspective view showing the base frame of FIG. 2.

The lens holder 3 is carried by a base frame (or carrier member) 4 having the following arrangement. As shown in FIG. 5, the base frame 4 includes a support portion 5, a front wall 6 and a rear wall 7. The front and rear walls 6–7 are both formed integral with the support portion. The front wall 6, which is longer than the rear wall 7, extends upwardly from a front end 5a of the support portion 5, while the rear wall 7 also extends upwardly from a rear end 5b of the support portion 5. Thus, the two walls 6–7 are parallel to each other. An upper end 6a of the front wall 6 has a specific profile suitable for providing intended shading correction.

Between the front and the rear walls 6–7, the support portion 5 has an arcuate upper surface 5c suitably configured for enabling close contact with an outer surface 3a of the lens holder 3. In the illustrated embodiment, a distance between the front wall 6 and the rear wall 7 is rendered equal to or slightly smaller than a length L2 of the lens holder 3 (see also FIG. 2). Thus, the lens holder 3 is readily fixed to the base frame 4 simply by inserting the lens holder 3 into a space between the front wall 6 and the rear wall 7.

Alternatively, an adhesive may be provided between the outer surface 3a of the lens holder and the upper surface 5c of the base frame, so that the lens holder 3 is more firmly fixed to the base frame 4. In this case, the distance between the front wall 6 and the rear wall 7 is not necessarily equal to or smaller than the length L2 of the lens holder 3 but can be greater than the length L2.

According to the present invention, the base frame 4 is formed with a groove 8 at the lower side (bottom side) of the support portion 5. As shown in FIG. 5, the groove 8 extends through the entire support portion 5. The width (w) and depth (d) of the groove 8 are determined so that the groove 8 allows smooth passage of a guide rail 12 (FIG. 2). Specifically, the width (w) and the depth (d) of the groove 8 are substantially equal to or slightly greater than those of the guide rail 12. (The guide rail 12 is fixed to a frame 11 (see FIG. 2) of the housing 21.) In this way, the base frame 4 can be moved along the guide rail 12, while being properly guided by the rail 12 without deviating sideways.

Description will now be made to an advantage of the present invention.

Referring to FIG. 2, as previously stated, the image-carrying reflection light 15 coming from the sheet member is converged by the lens 2. In front of the lens 2, the upper end 6a of the front wall 6 blocks part of the passage of the reflection light 15. In the sectional view of FIG. 2, the amount or extent of the upper end 6a blocking the light passage is shown by H.

According to the present invention, since the upper end 6a of the front wall 6 is fixed in position with respect to the lens 2, the distance L1 between the lens 2 and the upper end 6a is constant even when the base frame 4 is moved relative to the frame 11 of the housing 21 for adjusting the focus of the lens 2. Thus, the amount H of the blocked passage of the light 15 is constant, whereby intended shading correction is performed.

In the above preferred embodiment, the image reader is described as being incorporated in a multi-function apparatus. However, as is easily understood, the same image reader may be incorporated in an ordinary facsimile machine, an image scanner, or the like.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. An image reader for an image-carrying member, comprising:
   a light source for illuminating the image-carrying member;
   a sensor for detection of light coming from the image-carrying member along a predetermined path;
   a lens movable along said path relative to the sensor for focal adjustment;
   a lens holder for fixing the lens;
   a carrier member for carrying the lens holder, the carrier member being movable along said path relative to the sensor; and
   a shading correction shield member for partially blocking passage of said light, wherein the carrier member is provided with a first wall which includes the shield member and the lens and the shield member are held in fixed positional relationship with each other even if the carrier member is moved relative to the sensor for focal adjustment, the shield member being immovable relative to the lens.

2. The image reader according to claim 1, wherein the first wall has a height and is spaced from the lens by a distance, said height and distance of the first wall being invariable even if the carrier member is moved relative to the sensor for focal adjustment.

3. The image reader according to claim 2, wherein the carrier member is formed with a groove extending through the carrier member.

4. The image reader according to claim 3, further comprising a stationary guide rail fitted in the groove of the carrier member, the carrier member being slidable along the guide rail.

5. The image reader according to claim 2, wherein the lens holder comprises a cylindrical member having a curved side surface, and the carrier member has a curved surface for supporting the lens holder.

6. The image reader according to claim 5, wherein the carrier member is provided with a second wall which is shorter than the first wall.

7. The image reader according to claim 6, wherein a distance between the first wall and the second wall is substantially equal to a length of the lens holder.

8. The image reader according to claim 6, wherein the carrier member, the first wall and the second wall are formed integral to each other as a single piece.

9. The image reader according to claim 1, wherein the first wall is held in constant contact with an end of the lens holder so that the lens and the shield member maintain the fixed positional relationship.

10. An image reader for an image-carrying member, comprising:
    a sensor for detection of light coming from the image-carrying member along a predetermined path;
    a lens movable along said path relative to the sensor for focal adjustment;
    a lens holder for fixing the lens;
    a carrier member for carrying the lens holder, the carrier member being movable along said path relative to the sensor; and
    a shading correction shield member for partially blocking passage of said light, wherein the carrier member is provided with a first wall which includes the shield member and the lens and the shield member are held in fixed positional relationship with each other even if the carrier member is moved relative to the sensor for focal adjustment, the shield member being immovable relative to the lens.

11. A facsimile machine incorporating an image reader for an image-carrying member, the image reader comprising:
    a light source for illuminating the image-carrying member;
    a sensor for detection of light coming from the image-carrying member along a predetermined path;
    a lens movable along said path relative to the sensor for focal adjustment;
    a lens holder for fixing the lens;
    a carrier member for carrying the lens holder, the carrier member being movable along said path relative to the sensor; and
    a shading correction shield member for partially blocking passage of said light, wherein the carrier member is provided with a first wall which includes the shield member and the lens and the shield member are held in fixed positional relationship with each other even if the carrier member is moved relative to the sensor for focal adjustment, the shield member being immovable relative to the lens.

12. The facsimile machine according to claim 11, wherein the first wall has a height and is spaced from the lens by a distance, said height and distance of the first wall being invariable even if the carrier member is moved relative to the sensor for focal adjustment.

13. The facsimile machine according to claim 12, wherein the carrier member is formed with a groove extending through the carrier member.

14. The facsimile machine according to claim 13, wherein the image reader further comprises a stationary guide rail fitted in the groove of the carrier member, the carrier member being slidable along the guide rail.

15. The facsimile machine according to claim 14, wherein the lens holder comprises a cylindrical member having a curved side surface, and the carrier member has a curved surface for supporting the lens holder.

16. The facsimile machine according to claim 15, wherein the carrier member is provided with a second wall which is shorter than the first wall.

17. The facsimile machine according to claim 16, wherein a distance between the first wall and the second wall is substantially equal to a length of the lens holder.

18. A multi-function apparatus having functions of a facsimile machine, a printer, an image scanner, a photocopier, or the like, the multi-function apparatus incorporating an image reader for an image-carrying member, the image reader comprising:

a sensor for detection of light coming from the image-carrying member along a predetermined path;

a lens movable along said path relative to the sensor for focal adjustment;

a lens holder for fixing the lens;

a carrier member for carrying the lens holder, the carrier member being movable along said path relative to the sensor; and a shading correction shield member for partially blocking passage of said light, wherein the carrier member is provided with a wall which includes the shield member and the lens and the shield member are held in fixed positional relationship with each other even if the carrier member is moved relative to the sensor for focal adjustment, the shield member being immovable relative to the lens.

* * * * *